Aug. 7, 1928.
H. ROSER
1,679,989
BAKING OVEN
Filed April 29, 1925
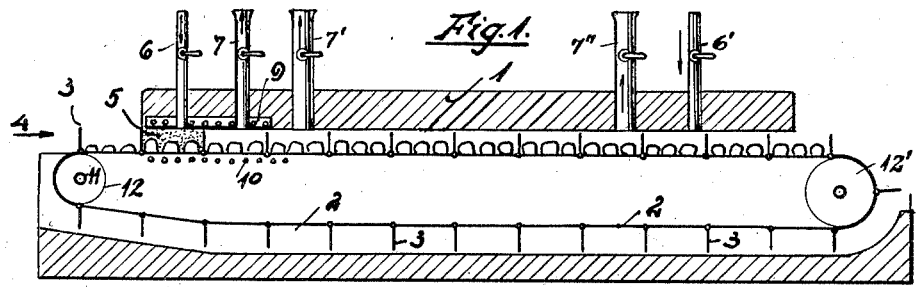
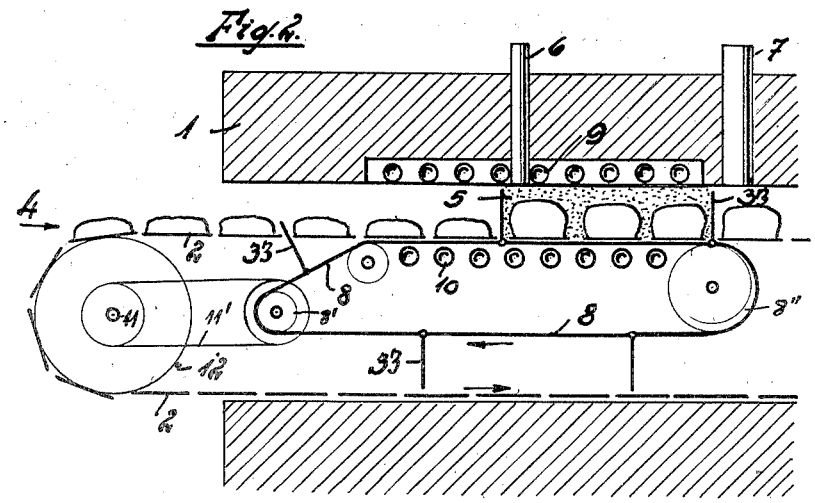
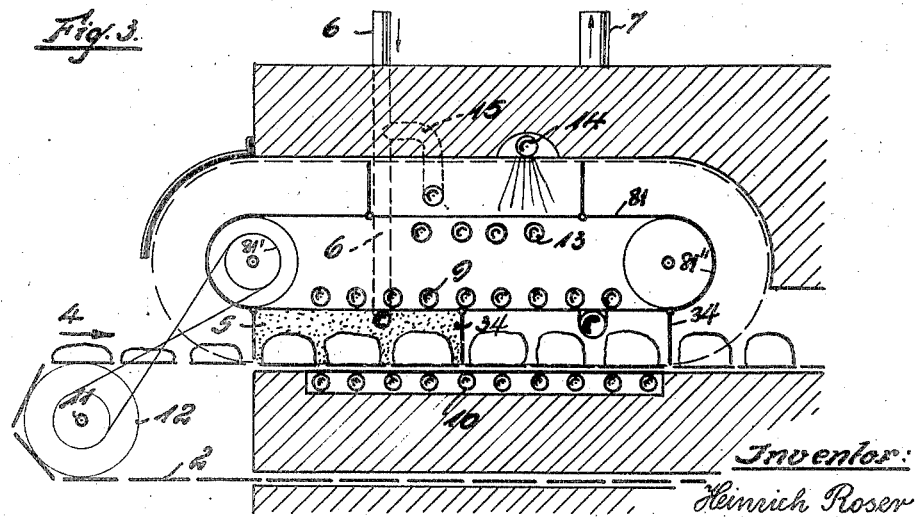
Inventor:
Heinrich Roser
by [signature]
Atty.

Patented Aug. 7, 1928.

1,679,989

UNITED STATES PATENT OFFICE.

HEINRICH ROSER, OF STUTTGART-CANNSTATT, GERMANY.

BAKING OVEN.

Application filed April 29, 1925, Serial No. 26,786, and in Germany February 28, 1925.

My invention relates to baking ovens and more especially to ovens of the continuously operated type in which the goods are carried through the oven by mechanical means, for instance a conveyor belt.

It is an object of my invention to provide means whereby the goods can be subjected on their way through the oven to various treatments, for instance, steaming, when they are travelling past a predetermined point of the oven.

To this end, I provide travelling partitions in the baking passage of the oven which move with the goods so as to form travelling chambers in said passage.

In the drawings affixed to this specification and forming part thereof several ovens embodying my invention are illustrated diagrammatically by way of example. In the drawings:

Fig. 1 is a longitudinal section of a baking oven in which the travelling partitions are carried on an endless conveyor belt.

Figs. 2 and 3 are similar views, drawn to a larger scale, of the front end of a baking oven in which the partitions are secured to separate belts below and above the conveyer belt, which carries the goods, respectively.

Referring to the drawings, in all the figures 1 is the brickwork of the baking oven and 2 is the endless conveyer belt which carries the goods. The belt may be supported on pulleys 12 and 12' at the ends of the oven. Only the pulley 12 with its shaft 11 is visible in Figs. 2 and 3.

It will be understood that the conveyer may be driven either continuously or intermittently by any suitable mechanism which is well known in the art and need not be shown nor described here. Means other than an endless belt may be employed for continuously or intermittently conveying the goods through the oven.

Referring more particularly to Fig. 1, the belt 2 comprises a plurality of links or laths on which the goods, for instance loaves of bread, are placed at the point designated by the arrow 4. Vertical partitions 3 are secured to the belt, these partitions being uniformly spaced apart. If desired, lateral plates—not shown—may be combined with the vertical partitions so that boxes open at the top are formed on the belt 3, or the chambers formed by the partitions may be bounded by the walls of the oven passage.

At the front end of the oven—or at any other suitable point—heating pipes 9 and 10 are arranged above and below the belt 2, respectively. In the case here shown these pipes are supposed to be gas burners, but obviously any other heating system, for instance electric heating elements, may be provided.

A pipe 6 supplies steam to the top of the passage near its front end. Pipes 7, 7' and 7" serve for discharging steam or vapour from the passage. A second steam supply pipe 6' may be arranged at the rear of the passage.

The goods, for instance loaves of dough are charged into the oven in front of that partition 3 which is about to enter the passage, and the belt 2 is moved in the direction of the arrow 4. When the front partition 3 is flush with the front end of the passage, steam is admitted to the chambers 5 between the two partitions through the pipe 6 and acts on the goods until the rear partition connects the chamber between the two partitions with the discharge pipe 7 so that the steam can escape and the goods are further treated under dry conditions. The vapour developed from the bread escapes at 7' and 7", and it can be steamed a second time by means of the pipe 6'.

In the oven illustrated in Fig. 2 the partitions 3 are secured to a separate belt 8 which travels below, and in synchronism with the belt 2. The belt 8 is supported on pulleys 8', 8" and is actuated by a belt or other drive 11' from the shaft 11 of the pulley 12. The partitions 3 are spaced apart and the motion of the belts 2 and 8 is timed in such a manner that the partitions 3 gradually enter between the laths of the belt 2 and finally form the steaming chamber 5 as described more particularly with reference to Fig. 1.

In the oven illustrated in Fig. 3 the belt 81, which carries the partitions 34, is arranged above the belt 2 on pulleys 81' and 81" and is actuated from the shaft 11 of the pulley 12. The gas pipes 9 are arranged above the lower run of the belt 81 and the gas pipes 10 are arranged below the upper run of the belt 2, as in the previous figures. Steam is supplied to the chamber 5 through a pipe 6 and discharged through a pipe 7.

Preferably the height of the partitions 34 is such that they abut against the laths of the belt 2 so as to make a comparatively tight fit therewith.

Instead of supplying steam to the oven from the outside through the pipe 6, steam may be generated in the oven, for instance by heating the belt 81 from below by pipes 13 and spraying water on the belt from above by a pipe 14. The steam thus generated is conducted to the passage connected with the pipe 6 through a branch passage 15.

Similar means for generating steam may also be provided in connection with the ovens shown in Figs. 1 and 2.

The number of auxiliary belts 8 or 81 is not limited to one, but any number of such belts may be provided, as required.

I wish it to be understood that I do not desire to be limited to the exact details of construcion shown and described, for obvious modifications will occur to a person skilled in the art.

I claim:—

1. A baking oven in which a passage is defined, means for conveying goods along the passage, partitions adapted to form a substantially closed chamber in the passage and means for supplying steam to and discharging steam from the chamber thus formed, said partitions being arranged to move along the passage in conformity with the motion of the goods.

2. A baking oven in which a passage is defined, means for conveying goods along the passage, partitions adapted to form a substantially closed chamber in the passage and means for generating steam in the oven and for supplying it to and discharging it from the chamber thus formed, said partitions being arranged to move along the passage in conformity with the motion of the goods.

3. A baking oven in which a passage is defined, an endless conveying means in the passage, a second endless conveying means adapted to travel in parallel and in synchronism with said first conveying means, partitions secured to one of said means and adapted to define substantially closed chamber in the passage, and means for supplying steam to and discharging steam from the chamber thus formed.

4. A baking oven in which a passage is defined, an endless conveying means in the passage and a second endless conveying means adapted to travel in parallel and in synchronism with said first conveying means, partitions secured to said second conveying means and adapted to define a substantially closed chamber in the passage, means for heating said second conveying means, means for spraying liquid onto said second conveying means and means for conducting the steam generated from the liquid to the chamber formed by said partitions.

In testimony whereof I affix my signature.

HEINRICH ROSER.